United States Patent [19]
Whitman, III

[11] 4,297,559
[45] Oct. 27, 1981

[54] APPARATUS FOR CONTROLLED PERFORATION OF MOVING WEBS WITH FIXED FOCUS LASER BEAM

[75] Inventor: Hobart A. Whitman, III, Asheville, N.C.

[73] Assignee: Olin Corporation, Pisgah Forest, N.C.

[21] Appl. No.: 37,727

[22] Filed: May 10, 1979

[51] Int. Cl.³ .................... B23K 26/02; H05B 3/60
[52] U.S. Cl. .................... 219/121 LB; 219/121 LK; 219/121 LL; 219/384
[58] Field of Search ............ 219/121 L, 121 LM, 384, 219/121 LB, 121 LK, 121 LL, 121 EH

[56] References Cited

U.S. PATENT DOCUMENTS

| | | | |
|---|---|---|---|
| 2,528,157 | 10/1950 | Menke | 219/384 |
| 2,528,158 | 10/1950 | Menke | 219/384 |
| 3,226,527 | 12/1965 | Harding | 219/384 |
| 3,582,466 | 6/1971 | Quirk | 219/121 R X |
| 3,622,742 | 11/1971 | Cohen et al. | 219/121 L |
| 3,827,142 | 8/1974 | Bennett | 219/121 LM X |
| 3,903,392 | 9/1975 | Konig et al. | 219/121 EH X |
| 3,920,951 | 11/1975 | Chovan et al. | 219/121 L |
| 4,025,752 | 5/1977 | Whitman | 219/384 |
| 4,032,743 | 6/1977 | Erbach et al. | 219/121 LM |
| 4,063,064 | 12/1977 | Saunders et al. | 219/121 L |
| 4,088,864 | 5/1978 | Theeuwes et al. | 219/121 LM |
| 4,095,084 | 6/1978 | Shutt | 219/121 LM |
| 4,115,683 | 9/1978 | Clark et al. | 219/121 LM X |
| 4,118,619 | 10/1978 | McArthur et al. | 219/121 L |
| 4,121,595 | 10/1978 | Heitmann et al. | 219/121 L |
| 4,131,782 | 12/1978 | Einstein et al. | 219/121 LM |

*Primary Examiner*—Gene Z. Rubinson
*Assistant Examiner*—Keith E. George
*Attorney, Agent, or Firm*—Kerkam, Stowell, Kondracki & Clarke

[57] ABSTRACT

A system for precision perforation of moving webs employing a pulsed, fixed focus laser beam wherein the laser pulses are automatically controlled in pulse repetition frequency and in pulse width to provide a desired preset web porosity. Closed loop circuitry responsive to web speed, sensed web porosity, and a porosity preset signal provides the precise system control needed to produce and maintain the preset porosity over a wide range of system variables. The illustrative embodiment described is particularly useful for perforating paper, film, and like materials where a high degree of product uniformity and porosity control is desired.

13 Claims, 1 Drawing Figure

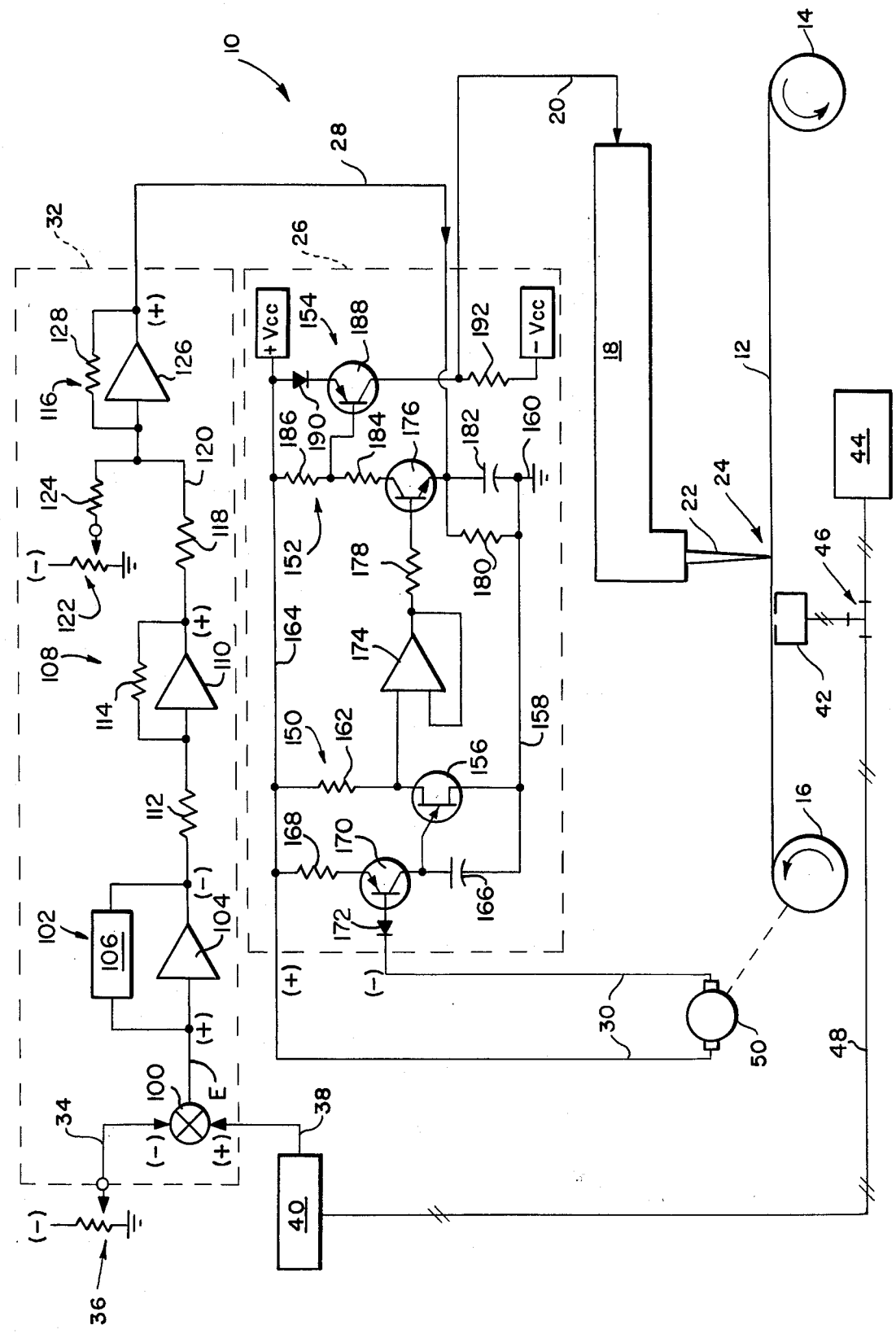

APPARATUS FOR CONTROLLED PERFORATION OF MOVING WEBS WITH FIXED FOCUS LASER BEAM

DESCRIPTION

1. Technical Field

The present invention relates generally to the controlled perforation of moving webs of paper, film, and the like, wherein web porosity is established by the ratio of perforated to unperforated areas as accomplished by burning minute holes in the web. More specifically, the invention relates to an apparatus and methods for providing a precisely controlled web porosity using a fixed focused laser beam as the perforating means, and closed loop control circuitry to create and maintain the precise porosity.

2. Background of Prior Art

Devices and techniques for perforating moving webs using various electrostatic discharge techniques and means which produce a large number of minute holes in the web are well known. A known system for controlling the porosity of a web by controlling the frequency and pulse width of an electric spark passing between electrostatic electrodes has been described in U.S. Pat. No. 4,025,752 by the inventor of the present invention. In that patent, there is described a system comprised of a large number of discharge electrodes transversely arrayed below which the web is driven for perforation, and the resulting web porosity is measured and compared with an operator-set reference porosity. Thereafter, a control circuit is used to automatically set the frequency and pulse width of a high voltage source to maintain the desired porosity.

In U.S. Pat. No. 4,121,595 to Heitman et al, there is disclosed apparatus for providing perforations close to or in the zone of filter plugs of filter cigarettes, and the like, using controllably pulsed laser beams. In particular, the pulsed laser beam is controlled in frequency and amplitude responsive to a porosity measurement of the final formed cigarette.

In a copending application bearing Ser. No. 948,108, and filed Oct. 3, 1978, now U.S. Pat. No. 4,218,606, the inventor of the present invention discloses a related apparatus and method for perforating webs using a mechanically interrupted high intensity coherent radiation beam wherein the control of web perforation is accomplished by controlling the hole size of the microperforations in the web. This is accomplished by varying the focus of the impinging laser beam so as to produce a hole of controllable size, or alternately varying web position normal to a fixed focus laser beam so as to achieve a related effect.

While each of these prior art approaches does provide a measure of efficacy in perforating webs, they also have attendant disadvantages. Some of the disadvantages are inherent in the techniques employed and are difficult to minimize. Electrode wear, for example, in the apparatus of the aforementioned U.S. Pat. No. 4,025,752 can lead to the need for periodic electrode replacement. The mechanical beam interrupter of the copending application leads to the need for a cumbersome mechanical assembly, and the use of variably focused laser beams may produce raggedly shaped perforations, or web burns as the focusing controls approach their effective limits.

BRIEF SUMMARY OF INVENTION

It is therefore a primary object of this invention to overcome the disadvantages of the prior art devices and to provide improved apparatus for automatically and precisely controlling the porosity of moving webs using a fixed focus laser beam as the perforating means.

The present invention is directed towards providing closed loop porosity control of a moving web using an electronically pulsed laser beam as the perforating means, where the pulses are controlled both in pulse rate and pulse width, and the laser beam focus is fixed at the point of contact with the web.

Another object of the present invention is to provide apparatus for focusing the microperforations in a moving web so as to produce holes having a smooth, uniform periphery.

A further object of the present invention is to provide laser beam apparatus for precisely perforating webs wherein the ratio of perforated to non-perforated areas, and hence the resultant porosity, can be controlled over a range of variables such as web speed and laser output power.

Another object of the present invention is to provide apparatus which produces a pulsed laser beam fixedly focused at the surface of the web being perforated, wherein the pulse parameters are varied to achieve a desired web porosity.

A further object of the present invention is to provide a pulsed laser beam apparatus for perforating webs using a closed loop control system responsive to web speed for controlling the pulse rate, and responsive to web porosity for controlling the pulse duration.

BRIEF DESCRIPTION OF DRAWING

Additional objects and advantages of the invention will become apparent to those skilled in the art as the description proceeds with reference to the accompanying drawing showing a schematic diagram of the closed loop porosity control system using a fixed focus laser beam.

DETAILED DESCRIPTION OF INVENTION

Referring to the drawing, there is shown a schematic diagram of the porosity control system according to the present invention. The overall system 10 provides controlled perforations in a moving web 12 being drawn from a supply roll 14 and being collected on a take-up roll 16, by drive means not shown. A laser assembly 18, responsive to controlled excitation applied via an input lead 20, produces a pulsed beam of coherent light 22 which is sharply focused at the point of web contact at a perforating station 24.

A pulse control circuit 26 provides the controlled laser excitation on the line 20 in response to a first set of system operating parameters contained in the signals on an input line 28, and to a second system operating parameter represented by the signals on a pair of input lines 30.

A porosity signal processing circuit 32 receives a porosity preset signal on an input line 34 from a preset potentiometer 36, and a sensed porosity signal on an input line 38 from a vacuum transducer 40. Downstream from the perforation station 24, the porosity of the web 12 is sensed by a porosity detector 42 which is supplied from a constant flow vacuum source 44 via one branch of a tee fitting 46. A second branch of the tee 46 is routed via a vacuum line 48 to the vacuum transducer 40. A mechanical output from the drive mechanism associated with the take-up roll 16 (shown by the dashed line) is used to drive a DC velocity tachometer 50, whose corresponding electrical output is applied via the lines 30 to the pulse control circuit 26.

An overview of the operation of the porosity control system 10 is facilitated by first considering the mechanical and pneumatic elements of the drawing. Briefly, the rotational speed of the driven take-up roll 16 is translated into lineal speed of the web 12 past the perforating station 24 via the directly linked tachometer 50. Tachometer 50 provides, on the pair of lines 30, an input signal to the pulse control circuit which is directly proportional to web speed. The porosity of the perforated web as sensed by the porosity detector 42 is converted into an analog voltage by the pressure transducer 40. Therefore, the porosity signal processing circit 32 responding to desired web porosity on its input line 34 and to actually measured web porosity on its input line 38, produces an output error signal on its line 28 which is applied via the line 28 to the pulse control circuit 26. The pulse control circuit 26, responsive to web speed on the lines 30 and processed porosity signals on the line 28, is configured to produce an output pulse train which is controlled both in pulse repetition frequency and in pulse width. This output pulse train is applied to the laser assembly 18 which in turn provides bursts of light (the pulsed beam) which are a replica of the applied electrical excitation. This produces a web perforation wherein the individual perforations correspond in rate and duration directly to the applied pulse train. Thus, there is implemented a closed loop web perforation system using a controllably pulsed laser beam as the perforation means in a system which can compensate for variations in web speed, laser power, web thickness, and so forth.

The potentiometer 36 is operator controlled to apply a DC voltage corresponding to the desired web porosity via a line 34 to a summing junction 100 within the porosity signal processing circuit 32. The pressure transducer 40 produces a DC voltage corresponding to the sensed web porosity and applies this voltage via a line 38 to a second input of the summing junction 100. The error signal E from the junction 100 is applied to a first error signal amplification stage 102 comprised of an operational amplifier 104 and a stability/gain feedback network 106. The amplified error signal is applied to an inverting amplifier stage 108 consisting of an operational amplifier 110 and equal valued input and feedback resistors respectively 112 and 114. A third inverting amplifier stage 116 is configured to accept the amplified error signal via an input resistor 118 and a line 120, and a DC bias signal established by a potentiometer 122 and applied via a second input resistor 124 to the line 120. The third inverting amplifier stage 116 is implemented using an operational amplifier 126 having a gain establishing feedback resistor 128 strapped across it. Thus, the output on line 28 from the porosity signal processing circuit 32 represents a DC voltage containing an amplified and processed replica of the error signal E needed to provide the closed loop porosity control action. The implementation of circuit 32 is entirely analog, therefore, the various internal biasing voltages (for example, the potentiometer 122) and amplification scale factors are established in accordance with well-known and conventional analog and servomechanism design practices.

The pulse control circuit 26 is comprised primarily of a pulse repetition frequency (PRF) controlling section 150, a pulse width controlling section 152, and a power output section 154. A unijunction transistor 156 has its first base connected via a lead 158 to a circuit ground 160, and its second base connected via a resistor 162 and a line 164 to collector voltage +Vcc. The emitter of unijunction 156 is connected to the intersection of a series RC circuit consisting of a capacitor 166, whose distal end is connected to system ground 160, and further consisting of the series combination of a fixed resistor 168 and the collector-to-emitter resistance of a PNP transistor 170. The RC connected unijunction transistor 156 comprises a free running relaxation oscillator whose frequency is inversely proportional to the values of R and C employed.

The base of the transistor 170 is connected to the anode of the diode 172 whose cathode is in turn routed to the negatively poled output of the tachometer 50 on a first one of the lines 30. The positively poled output on a second one of the lines 30 is routed to the +Vcc bus via the line 164. An output from the second base of unijunction 156 is routed to a noninverting input of an operational amplifier 174 which has its output terminal strapped back to its inverting input to implement the conventional voltage follower circuit. The PRF controlling section 150 therefore produces a pulsed waveform having a pulse repetition frequency determined by the capacitor 166, and the combined resistances of the fixed resistor 168 and the resistance of the transistor 170. As the collector-to emitter resistance of the transistor 170 is inversely proportional to the magnitude of the DC voltage applied via the tachometer 50, it can be seen that the pulse repetition frequency corresponds directly to web lineal speed.

An NPN transistor 176 has its base connected via a resistor 178 to the output of the voltage follower 174, and its emitter connected via a resistor 180 to system ground 160. A capacitor 182 is paralleled across the resistor 180, and the intersection of these two components with the emitter of transistor 176 serves as the input terminal to receive the processed porosity signals on the line 28. The collector of transistor 176 is routed to the +Vcc supply via a pair of serially connected resistors 184 and 186. The interconnection point of these two resistors is routed to a base of PNP output power transistor 188. Functionally, the transistor 176 receives the controlled PRF waveform on its base element and the processed porosity signals on its emitter element and produces an output pulse train having the same pulse repetition rate as the input, but wherein each individual pulse is width (duration) modulated in response to the processed porosity signal. The output transistor 188 has its emitter connected via a diode 190 to the +Vcc supply, and its collector connected via a resistor 192 to the −Vcc supply. The power amplified pulse train is taken from the collector element of transistor 188 and is applied via the line 20 to the laser assembly 18. The laser assembly 18 is comprised of a conventional coherent light beam producing laser whose output is optically coupled by suitable beam shaping and bending means so as to produce the sharply focused output light beam 22.

For simplicity of exposition, the output of laser assembly 18 is shown as a single beam 22 sharply focused at the point of contact with the moving web 12. This would of course, produce only a single line of perforations in the moving web. Obviously, additional means are required to perforate the web across its transverse direction. These means, which do not form part of the present invention, may be implemented using straightforward beam splitting techniques operating on a single output beam from the laser source as shown in the aforementioned U.S. Pat. No. 4,121,595, or by any other suitable means.

The circuitry described above represents a preferred embodiment of the present invention. Obviously, a number of ancillary features may be added to the arangment of the drawing to enhance operational performance. For example, a number of indicators may be incorporated to provide visual indications to an operator of the key system parameters, or to provide signals in suitable form for permanent recording. Thus, the output of the tachometer 50 may be converted to provide a direct display of web speed on an analog or digital readout (not shown); an output from the pressure transducer 40 may be used to provide a visual indication of measured web porosity; and the output of the set porosity potentiometer 36 may be converted into direct engineering units so as to provide a precise quantitative indication of the web porosity being ordered. The interested reader is referred to the aforementioned U.S. Pat. No. 4,025,752 for a description of these, and other ancillary features.

As an example of system operation in the control of web porosity, consider the case where sensed web porosity is momentarily higher than the operator selected porosity set point. Initially this will produce an increase in the magnitude of the error signal E from the summing junction 100 which will be amplified, level set, and outputted from the porosity signal processing circuit 32 into the pulse width control section 152 of the pulse control circuit 26. The polarities of the intermediate circuitry are set such that for a sensed increase in web porosity, the pulse width control circuit 152 will produce a porportionally narrower pulse. The PRF controlling section 150, however, remains the same as before. The resulting pulse train will produce "shorter" perforated holes in the moving web, thereby producing a smaller ratio between perforated hole area and unperforated area, resulting in a decreased web porosity. The sensed porosity signal will therefore decrease, tending to minimize the error signal E from the summing junction 100, and in turn restoring an equilibrium condition between the set porosity and the produced porosity. Conversely, for a sensed web porosity momentarily lower than the operator selected porosity set point, an increased pulse width would be generated in the pulse width control section 152. The result would be "longer" perforated holes in the moving web thereby increasing the ratio between perforated hole area and unperforated area and, as a result, would quickly reflect itself in properly sensed web porosity signals. Again, the system balance would be restored.

Similarly, any increase or decrease in web lineal speed would be immediately reflected in the output of the tachometer 50, which would in turn control the PRF in a manner to compensate for the changed speed. As an example, consider an increased web speed, for any reason. This would result in an increase in the output voltage of tachometer 50, and a consequent decrease in the collector-emitter resistance of the transistor 170. As the free running frequency of the RC coupled unijunction is inversely proportional to the RC time constant, the decrease in the resistance of transistor 170 causes an increase in the repetition rate of the pulse frequency. The increased web speed, if taken by itself (i.e., without closed loop correction) would cause a decrease in the sensed web porosity. This is due to a decrease in the ratio of perforated area to non-perforated area which would result from an increased web distance between adjacent perforations, which perforations would be of fixed area. However, the PRF controlling section 150 would come into play to first increase the PRF proportionally to the increased web speed, and the pulse width control section 152, as described above, would adjust the pulse width such that the sensed web porosity would again quickly become equal to the set porosity. This would be reflected in the same ratio of perforated area to non-perforated area as existed before the change in web speed.

Therefore, it is clear that the system is capable of unattended compensated control for a wide variety of desired web porosities under the full range of variables which could cause a discrepancy therein.

In the manner similar to that outlined above, the closed loop porosity control system would automatically compensate for variables such as web thickness, secular changes in laser power output, and so forth. Most importantly, it should be noted that the method of porosity control of the present invention gains superiority from the fact that the focused laser beam can be adjusted at a fixed point directly on the moving web. This provides maximum heat intensity in a tightly prescribed area for crisp perforations, and produces web vaporization that completely eliminates ragged holes which resulted from other prior art systems.

An additional advantage of the circuitry and technique outlined above derives from the use of the electronic pulsing technique which negates the requirement for costly and cumbersome mechanical chopping means used in some previous laser perforation control systems. Also, as is clear from the examples, the present invention outlines a closed loop control system having a wide dynamic range of operability and can be implemented using fairly conventional electronic circuitry without incurring the penalties of unwanted complexities.

Thus, there has been shown a new and improved system for achieving closed loop control of pulses of high intensity coherent light to perforate a web wherein the precision and uniformity of the output product is improved. The illustrative embodiment of this invention has been described primarily with regard to the manufacture of paper, film, and the like thin webs. The invention is particularly applicable to the manufacture of cigarette paper, and in this regard, it is noted that the intake of tars and nicotine while smoking is, in part, dependent upon the porosity of the cigarette paper. Though noting the relative advantages of this system to the manufacturing of cigarette paper, it is comtemplated that the use of this invention is not so limited and would have like applicability for the perforation of other materials including cellophane, synthetic polypropylenes, and other fibrous or paper products such as teabag paper.

Although the invention has been described in terms of selected preferred and alternate embodiments, the invention should not be deemed limited thereto, since other embodiments and modifications will readily occur to one skilled in the art. It is therefore to be understood that the appended claims are intended to cover all such modifications as fall within the true scope and spirit of the invention.

I claim:

1. Apparatus for controllably perforating a moving web by a laser beam, comprising:
   a laser assembly for producing a pulsed beam in response to a pulsed excitation signal and for directing said beam to the web at a perforating station;
   a porosity feedback arrangement producing an error signal representative of the difference between actual web porosity as measured and desired web porosity as preset, said feedback arrangement including porosity sensing means for sensing the porosity of the perforated web and for providing a porosity signal corresponding to said sensed porosity, preset means for producing a preset signal corresponding to a desired web porosity, and a comparator circuit connected to said porosity sensing means and to said preset means for producing the error signal as a function of the difference between said porosity signal and said preset signal;
   velocity sensing means for producing a sensed velocity signal corresponding to actual web velocity; and
   a control circuit for said laser assembly, said control circuit connected to receive both the error signal and the sensed velocity signal, and operable to produce a continuous pulse train in response, and said control circuit connected to said laser assembly to provide a replica of said pulse train as said laser pulsed excitation signal, the repetition rate of said pulse train varying directly in response to the sensed velocity signal and the duration of each pulse in said pulse train varying in response to the error signal, whereby a constant number of elongated perforations per unit length are produced, with the length of the perforations dependent upon the porosity feedback error signal.

2. The apparatus of claim 1 wherein said velocity sensing means comprises a tachometer producing an electrical output having a predetermined relationship to web lineal velocity.

3. The apparatus of claim 2 wherein said tachometer is a DC tachometer and said predetermined relationship is a substantially linear one.

4. The apparatus of claim 2 wherein said control circuit further comprises voltage sensitive resistive means for controlling the repetition rate of said pulse train in response to said sensed velocity signal.

5. The apparatus of claim 4 wherein said porosity sensing means compises a sensing station with a vacuum system operated porosity detecting chamber positioned at the sensing station and said porosity signal is generated by a pressure to voltage transducer connected into said vacuum system.

6. The apparatus of claim 5 further comprising transport means for transporting said web past said perforating station and past said sensing station, and for driving said velocity sensing means at a rotational speed corresponding to the lineal speed of said transported web.

7. A control system for a laser beam perforating apparatus, comprising:
   a porosity feedback arrangement producing an error signal representative of the difference between actual web porosity as measured and desired web porosity as preset, said feedback arrangement including porosity preset means for producing a preset signal corresponding to a predetermined web porosity, porosity sensing means for producing a porosity signal corresponding to actual web porosity after perforation, and a comparator circuit connected to said preset and sensing means for producing the error signal as a function of the difference between said preset signal and said porosity signal;
   velocity sensing means for producing a sensed velocity signal corresponding to actual web velocity; and
   an electronic control circuit connected to said comprator circuit of said porosity feedback arrangement and to said velocity sensing means for producing a continuous pulse train responsive both to said sensed velocity signal and to said error signal and for providing a replica of said pulse train to said fixed focus laser beam perforating apparatus, the repetition rate of said pulse train varying directly in response to the sensed velocity signal and the duration of each pulse in said pulse train varying in response to the error signal, whereby a constant number of elongated perforations per unit length are produced, with the length of the perforations dependent upon the porosity feedback error signal.

8. The control system of claim 7 wherein said velocity sensing means comprises a DC tachometer producing an electrical output signal having a substantially linear relationship to said web lineal velocity.

9. The control system of claim 7 wherein said pulse repetition rate and pulse duration are established by said electronic control circuit so as to minimize the magnitude of said error signal.

10. The control system of claim 9 wherein said control circuit further comprises voltage sensitive semiconductor resistive means for controlling the repetition rate of said pulse train in response to said sensed velocity signal.

11. The control system of claim 10 wherein said porosity sensing means comprises a vacuum operated porosity detecting chamber and said sensed porosity signal is produced by a pressure to voltage transducer.

12. The control system of claim 11 wherein said comparator circuit further comprises amplifier means for amplifying said produced error signal.

13. In a method for controllably perforating a moving web by a pulsed laser beam, the improvements comprising:
   (a) focusing the pulsed laser beam at a single plane coincident with the surface of said moving web;
   (b) pulsing the laser beam at a repetition rate corresponding to the lineal velocity of the moving web;
   (c) pulsing the laser beam with an individual pulse duration corresponding to the difference between an actual web porosity signal and a preset signal representing desired web porosity; and
   (d) thereby controllably perforating said web by a serially distributed perforation pattern having a desired ratio of perforated to non-perforated area.

* * * * *